United States Patent
Ohashi

(10) Patent No.: US 10,829,147 B2
(45) Date of Patent: Nov. 10, 2020

(54) POWER CONVERSION DEVICE, MOTOR DRIVE UNIT, AND ELECTRIC POWER STEERING DEVICE

(71) Applicant: Nidec Corporation, Kyoto (JP)

(72) Inventor: Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/331,564

(22) PCT Filed: Sep. 15, 2017

(86) PCT No.: PCT/JP2017/033392
§ 371 (c)(1),
(2) Date: Mar. 8, 2019

(87) PCT Pub. No.: WO2018/061818
PCT Pub. Date: Apr. 5, 2018

(65) Prior Publication Data
US 2019/0210640 A1 Jul. 11, 2019

(30) Foreign Application Priority Data
Sep. 30, 2016 (JP) ................. 2016-192996

(51) Int. Cl.
*B62D 5/04* (2006.01)
*H02P 27/06* (2006.01)
(Continued)

(52) U.S. Cl.
CPC ............ *B62D 5/0487* (2013.01); *B62D 5/04* (2013.01); *B62D 5/0484* (2013.01); *B62D 6/00* (2013.01);
(Continued)

(58) Field of Classification Search
CPC .. B62D 5/0484; B62D 5/0487; B62D 5/0481; B62D 5/04; B62D 6/00; H02P 27/06;
(Continued)

(56) References Cited

U.S. PATENT DOCUMENTS 5,414,339 A * 5/1995 Masaki .................. B60L 3/003
318/800
6,158,553 A * 12/2000 Oshima .................. H02P 25/22
187/293
(Continued)

FOREIGN PATENT DOCUMENTS

JP 2008-132919 A 6/2008
JP 2008132919 A * 6/2008
(Continued)

OTHER PUBLICATIONS

Official Communication issued in International Patent Application No. PCT/JP2017/033392, dated Dec. 26, 2017.

*Primary Examiner* — Thai T Dinh
(74) *Attorney, Agent, or Firm* — Keating & Bennett

(57) ABSTRACT

A power conversion device includes a first inverter connected to a first end of a winding of each phase of a motor, a second inverter connected to a second end of the winding of each phase, and first and second switching circuits. The power conversion device further includes a normal state operation mode in which power conversion is performed by using a first neutral point of the winding of each phase in the second inverter and the first inverter and an abnormal state operation mode in which the power conversion is performed by using a second neutral point of the winding of each phase in the first inverter and the second inverter. An operation mode of the power conversion is switched from the normal state operation mode to the abnormal state operation mode when at least one switch in the first inverter fails.

18 Claims, 12 Drawing Sheets

(51) Int. Cl.
  *H02M 7/48* (2007.01)
  *H02P 29/024* (2016.01)
  *B62D 6/00* (2006.01)

(52) U.S. Cl.
  CPC .............. *H02M 7/48* (2013.01); *H02P 27/06* (2013.01); *H02P 29/024* (2013.01); *H02P 29/0241* (2016.02)

(58) Field of Classification Search
  CPC .. H02P 29/0241; H02P 29/028; H02P 29/024; H02P 29/0243; H02M 7/5387
  See application file for complete search history.

(56) References Cited

U.S. PATENT DOCUMENTS

| | | | | |
|---|---|---|---|---|
| 7,439,697 | B2* | 10/2008 | Miyazaki | H02M 7/48 318/400.41 |
| 8,659,253 | B2* | 2/2014 | Satou | B62D 5/0487 318/139 |
| 8,698,435 | B2* | 4/2014 | Tada | H02H 7/0844 318/400.21 |
| 9,327,759 | B2* | 5/2016 | Yamamoto | B62D 5/0484 |
| 2011/0156623 | A1 | 6/2011 | Nakamura et al. | |
| 2011/0204839 | A1* | 8/2011 | Mukai | B62D 5/0403 318/724 |
| 2011/0315469 | A1* | 12/2011 | Uryu | B62D 5/0463 180/443 |
| 2013/0094266 | A1* | 4/2013 | Balpe | H02M 7/46 363/131 |
| 2015/0298727 | A1* | 10/2015 | Kimpara | B62D 5/0463 701/43 |

FOREIGN PATENT DOCUMENTS

| | | |
|---|---|---|
| JP | 2014-192950 A | 10/2014 |
| JP | 2014192950 A * | 10/2014 |

* cited by examiner

POWER CONVERSION DEVICE, MOTOR DRIVE UNIT, AND ELECTRIC POWER STEERING DEVICE

BACKGROUND OF THE INVENTION

1. Field of the Invention

The present disclosure relates to a power conversion device that converts electric power supplied to an electric motor, a motor drive unit, and an electric power steering device.

2. Description of the Related Art

An electric motor (hereinafter simply referred to as "motor") such as a brushless DC motor and an alternating-current synchronous motor is generally driven by a three-phase current. In order to accurately control a waveform of the three-phase current, complex control technology such as vector control is used. In such control technology, an advanced mathematical operation is required, and a digital arithmetic circuit such as a microcontroller (microcomputer) is used. Vector control technology is utilized for use where load fluctuation of the motor is large, such as fields of, for example, a washing machine, an electric assist bicycle, an electric scooter, an electric power steering device, an electric vehicle, industrial equipment and the like. On the other hand, in a motor whose output is relatively small, another motor control method such as a pulse-width modulation (PWM) method is adopted.

In an automotive field, an automobile electronic control unit (ECU) is used in a vehicle. The ECU has the microcontroller, a power source, an input-output circuit, an analog to digital (AD) converter, a load drive circuit, a read only memory (ROM), and the like. An electronic control system is built with the ECU as a core. For example, the ECU processes a signal from a sensor to control an actuator such as the motor. More specifically, the ECU controls an inverter in a power conversion device while monitoring rotation speed and torque of the motor. Under the control of the ECU, the power conversion device converts driving power supplied to the motor.

In recent years, a mechanically and electrically integrated type motor in which the motor, the power conversion device, and the ECU are integrated has been developed. Especially in the automotive field, a high quality assurance is required from a viewpoint of safety. Therefore, a redundant design in which safe operation is able to continue even when a part or parts fail is adopted. As an example of the redundant design, it is considered to provide two power conversion devices for one motor. As another example, it is considered to provide a backup microcontroller in addition to a main microcontroller.

In the conventional technology described above, further improvement in current control at normal and abnormal states has been required.

SUMMARY OF THE INVENTION

An exemplary power conversion device of the present disclosure is a power conversion device converting electric power from a power source into electric power to be supplied to a motor having n-phase windings, where n is an integer of 3 or more. The power conversion device includes a first inverter connected to a first end of the winding of each phase of the motor, a second inverter connected to a second end of the winding of each phase, a first switching circuit that includes a first switch to switch connection and disconnection between the first inverter and the power source and a second switch to switch connection and disconnection between the first inverter and ground, a second switching circuit that includes a third switch to switch connection and disconnection between the second inverter and the power source or a fourth switch to switch connection and disconnection between the second inverter and the ground. The power conversion device further includes a normal state operation mode in which power conversion is performed by using a first neutral point of the winding of each phase in the second inverter and the first inverter, and an abnormal state operation mode in which the power conversion is performed by using a second neutral point of the winding of each phase in the first inverter and the second inverter. An operation mode of the power conversion is switched from the normal state operation mode to the abnormal state operation mode when at least one of a plurality of switches included in the first inverter fails.

Another exemplary power conversion device of the present disclosure is a power conversion device converting electric power from a power source into electric power to be supplied to a motor having n-phase windings, where n is an integer of 3 or more. The power conversion device includes a first inverter connected to a first end of the winding of each phase of the motor, a second inverter connected to a second end of the winding of each phase, a first switching circuit that includes a first switch to switch connection and disconnection between the first inverter and the power source or a second switch to switch connection and disconnection between the first inverter and ground, a second switching circuit that includes a third switch to switch connection and disconnection between the second inverter and the power source or a fourth switch to switch connection and disconnection between the second inverter and the ground. The power conversion device further includes a normal state operation mode in which power conversion is performed by using a first neutral point of the winding of each phase in the second inverter and the first inverter, and an abnormal state operation mode in which the power conversion is performed by using a second neutral point of the winding of each phase in the first inverter and the second inverter. An operation mode of the power conversion is switched from the normal state operation mode to the abnormal state operation mode when at least one of a plurality of switches included in the first inverter fails.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Before describing exemplary embodiments of the present disclosure, knowledge of the inventor of the present application, which forms the basis of the present disclosure, will be described.

In the power conversion device of Japanese Laid-Open Patent Publication No. 2014-192950, the power source and the GND and each of the two inverters are always kept connected. Due to its configuration, the connection between the power source and the failed inverter is not separable. The inventor of the present application found a problem that even though the neutral point is configured in the failed inverter in the abnormal state, the failed inverter draws current from the power source. As a result, power loss occurs in the failed inverter.

Like the power source, the connection between the failed inverter and the GND is not separable. The inventor of the present application has found a problem in which even though the neutral point is configured in the failed inverter in the abnormal state, a current supplied to the winding of each phase via the normal inverter does not return to the inverter of the supply source but flows into the GND from the failed inverter. In other words, a closed loop of a drive current is not formed. It is desirable that the current supplied from the normal inverter to the winding of each phase flows into the GND via the inverter of the supply source.

Hereinafter, exemplary embodiments of a power conversion device, a motor drive unit, and an electric power steering device of the present disclosure will be described in detail with reference to accompanying drawings. However, in order to avoid unnecessary redundancy of the following description and make it easier for a person skilled in the art to understand, a detailed description more than necessary is sometimes omitted. For example, a detailed description of already well-known matter and a redundant description on substantially the same configuration may be omitted.

In the specification of the present application, the exemplary embodiment of the present disclosure will be described with an example of the power conversion device that converts electric power to be supplied to a three-phase motor having windings of three-phases (U-phase, V-phase, W-phase). However, the power conversion device that converts the electric power to be supplied to an n-phase motor having windings of n-phases (n is an integer of 4 or more) such as four-phases or five-phases is also within scope of the present disclosure.

Figure 1:
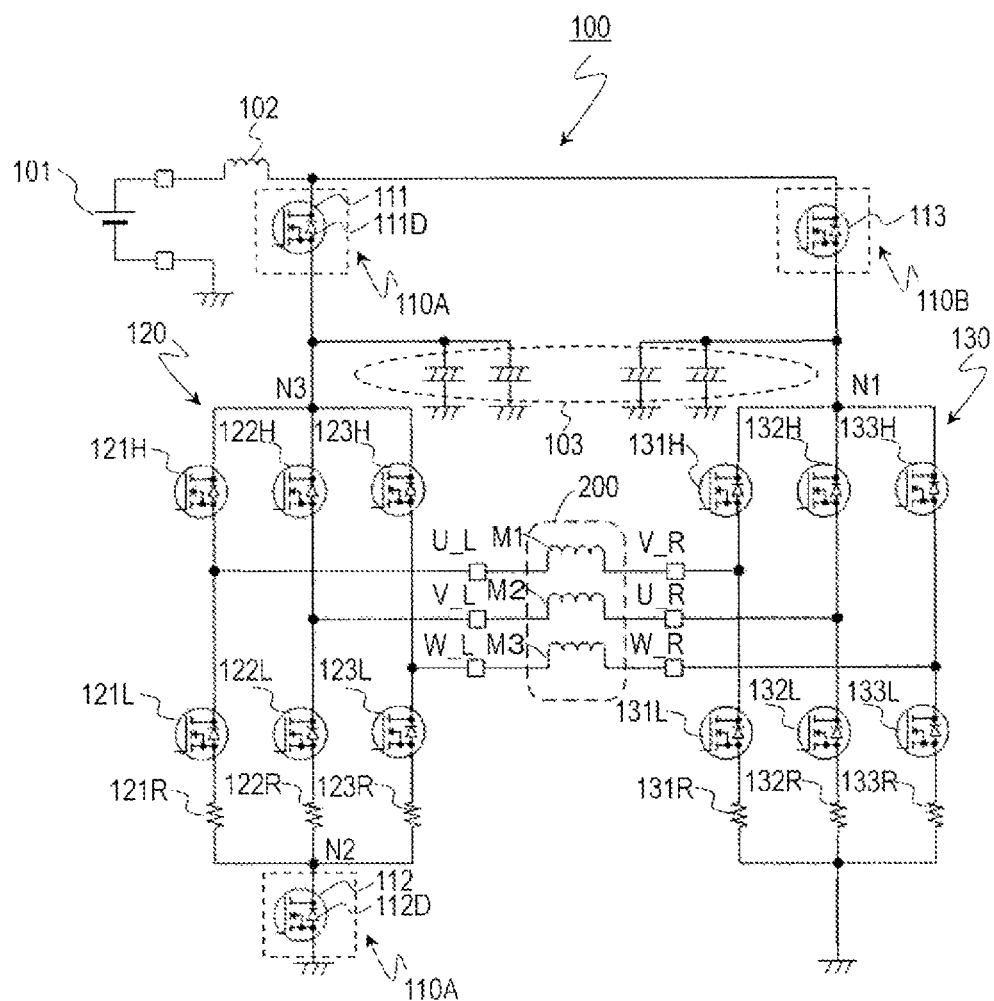
FIG. 1 is a circuit diagram illustrating a typical circuit configuration of a power conversion device 100 according to a first exemplary embodiment of the present disclosure.

FIG. 1 schematically illustrates a typical circuit configuration of a power conversion device 100 according to the present exemplary embodiment.

The power conversion device 100 includes switching circuits 110A, 110B, a first inverter 120, and a second inverter 130. The power conversion device 100 converts electric power to be supplied to various motors. A motor 200 is, for example, a three-phase alternating-current motor. In the specification of the present application, an inverter on a left side of the drawing is referred to as the first inverter 120 and an inverter on a right side is referred to as the second inverter 130 for convenience of description. However, it goes without saying that the above relationship may be reversed.

The motor 200 has a U-phase winding M1, a V-phase winding M2, and a W-phase winding M3, and is connected to the first inverter 120 and the second inverter 130. More specifically, the first inverter 120 is connected to one end of the winding of each phase of the motor 200, and the second inverter 130 is connected to the other end of the winding of each phase. In the specification of the present application, "connection" between components (constituent elements) each other means mainly electrical connection. The first inverter 120 has terminals U_L, V_L, and W_L corresponding to each phase, and the second inverter 130 has terminals U_R, V_R, and W_R corresponding to each phase.

The terminal U_L of the first inverter 120 is connected to the one end of the U-phase winding M1, the terminal V_L is connected to the one end of the V-phase winding M2, and the terminal W_L is connected to the one end of the W-phase winding M1. Similarly to the first inverter 120, the terminal U_R of the second inverter 130 is connected to the other end of the U-phase winding M1, the terminal V_R is connected to the other end of the V-phase winding M2, and the terminal W_R is connected to the other end of the W-phase winding M1. This connection with the motor is different from so-called star connection and delta connection.

The switching circuit 110A is for the first inverter 120 and includes first and second switch elements 111, 112. The switching circuit 110B is for the second inverter 130 and includes a third switch element 113. In the specification of the present application, the switching circuit having the first and third switch elements 111, 113 provided on a side of a power source 101 is sometimes referred to as "power source side switching circuit", and the switching circuit having the second switch element 112 provided on the GND side is sometimes referred to as "GND side switching circuit".

In the power conversion device 100, the first inverter 120 is electrically connectable to the power source 101 and the GND by the switching circuit 110A. The second inverter 130 is electrically connectable to the power source 101 by the switching circuit 110B. More specifically, the first switch element 111 switches connection/disconnection between the first inverter 120 and the power source 101. The second switch element 112 switches connection/disconnection between the first inverter 120 and the GND. The third switch element 113 switches connection/disconnection between the second inverter 130 and the power source 101. In the circuit configuration example shown in FIG. 1, the second inverter 130 and the GND are always kept connected.

On and off of each of the first to third switch elements 111, 112, and 113 are controllable by, for example, a microcontroller or a dedicated driver. As each of the first to third switch elements 111, 112, and 113, for example, a transistor such as a field effect transistor (FET; typically a metal oxide semiconductor field effect transistor (MOSFET)) or an insulated gate bipolar transistor (IGBT) is widely usable. Alternatively, mechanical relays may be used as that switch elements. Hereinafter, an example using FETs as the first to third switch elements 111, 112, and 113 will be described, and the first switch element 111 will be referred to as an FET 111, for example.

The FET 111 has a freewheel diode 111D and is disposed so that the freewheel diode 111D faces the power source 101. More specifically, the FET 111 is arranged so that a forward current flows in the freewheel diode 111D toward the power source 101. The FET 113 is also arranged similarly to the FET 111.

The FET 112 has a freewheel diode 112D and is disposed so that the freewheel diode 111D faces the power source 101. More specifically, the FET 112 is arranged so that a forward current flows in the freewheel diode 112D toward the first inverter 120.

The number of the switch elements to be used is not limited to the illustrated example, but is appropriately determined in consideration of design specifications and the like. Particularly in an automotive field, since a high quality assurance is required from a viewpoint of safety, it is preferable to provide a plurality of the switch elements for each inverter in the power source side and GND side switching circuits.

Figure 2:
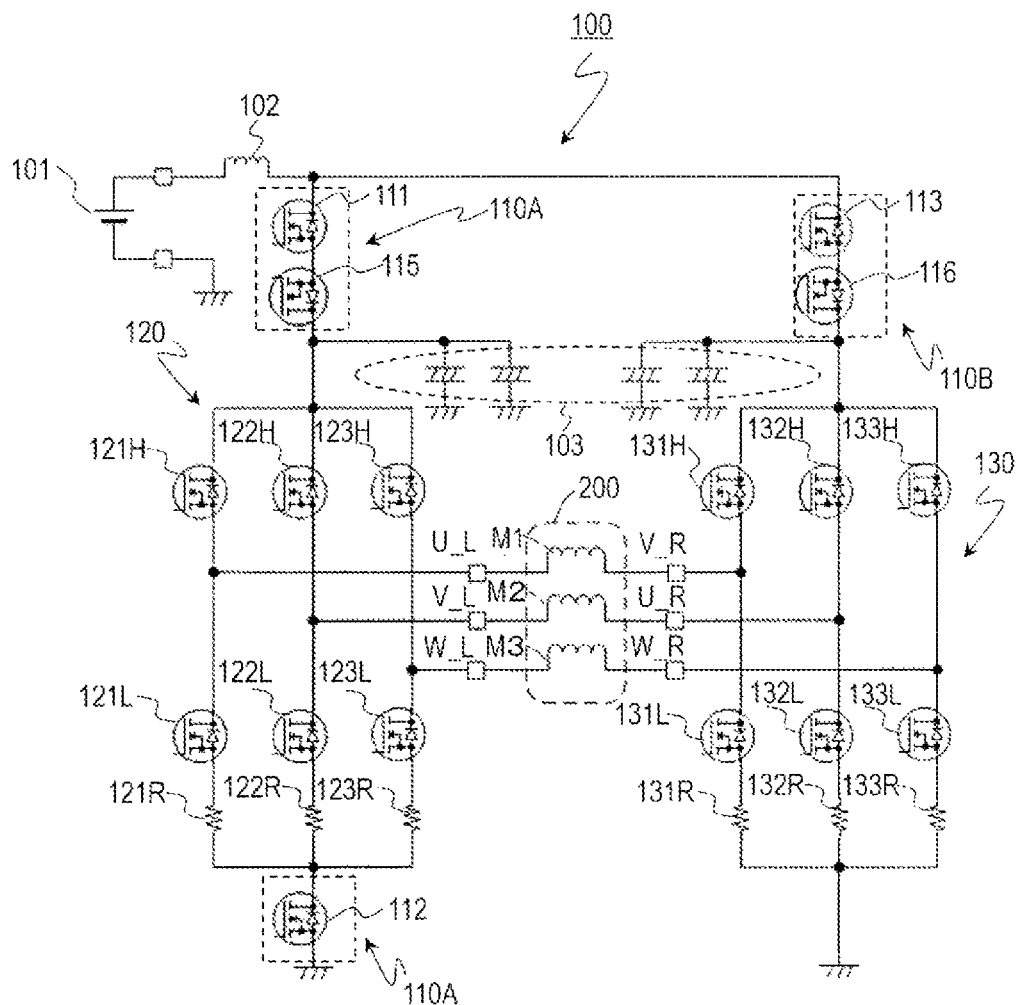
FIG. 2 is a circuit diagram illustrating another circuit configuration of the power conversion device 100 according to the first exemplary embodiment of the present disclosure.

FIG. 2 schematically illustrates another circuit configuration of the power conversion device 100 according to the exemplary embodiment.

The power source side switching circuit may further include a fifth switch element (FET) 115 and a sixth switch element (FET) 116 for reverse connection protection. The FET 111 and the FET 115 are arranged so that directions of freewheel diodes in the FETs oppose each other. The FET 113 and the FET 116 are arranged so that directions of freewheel diodes in the FETs oppose each other. Specifically, the FET 115 is arranged so that a forward current flows in the freewheel diode toward the first inverter 120. The FET 116 is arranged so that a forward current flows in the freewheel diode toward the second inverter 130. Even when the power source 101 is connected in a reverse direction, a reverse current is cut off by the two FETs for the reverse connection protection.

The power source 101 generates a predetermined source voltage. For example, a direct-current power source is used as the power source 101. However, the power source 101 may be an AC-DC converter and a DC-DC converter, or may be a battery (storage battery).

The power source 101 may be a single power source common to the first and second inverters 120, 130 or may have a first power source for the first inverter 120 and a second power source for the second inverter 130.

A coil 102 is provided between the power source 101 and the power source side switching circuit. The coil 102 functions as a noise filter and smooths high frequency noise included in a voltage waveform supplied to each inverter or high frequency noise generated in each inverter so as not to flow out to a side of the power source 101. Capacitors 103 are connected to a power source terminal of each inverter. Each of the capacitors 103 is a so-called bypass capacitor and suppresses a voltage ripple. Each of the capacitors 103 is, for example, an electrolytic capacitor, and capacity and the number to be used are appropriately determined according to the design specifications and the like.

The first inverter 120 (sometimes referred to as "bridge circuit L") includes a bridge circuit composed of three legs. Each leg has a low-side switching element and a high-side switching element. Switching elements 121L, 122L, and 123L shown in FIG. 1 are the low-side switching elements, and switching elements 121H, 122H, and 123H are the high-side switching elements. As the switching element, for example, an FET or an IGBT is usable. Hereinafter, an example of using FETs as the switching elements will be described, and the switching element may be referred to as the FET in some cases. For example, the switching elements 121L, 122L, and 123L are denoted as FETs 121L, 122L, and 123L.

The first inverter 120 has three shunt resistances 121R, 122R, and 123R as current sensors (see FIG. 4) for detecting a current flowing through the winding of each phase of the U-phase, the V-phase, and the W-phase. A current sensor 150 has a current detection circuit (not shown) for detecting a current flowing through each shunt resistance. For example, the shunt resistances 121R, 122R, and 123R are connected between the three low-side switching elements included in the three legs of the first inverter 120 and the GND, respectively. More specifically, the shunt resistance 121R is electrically connected between the FET 121L and the FET 111, the shunt resistance 122R is electrically connected between the FET 122L and the FET 111, and the shunt resistance 123R is electrically connected between the FET 123L and the FET 111. A resistance value of each of the shunt resistances is, for example, about 0.5 mΩ to 1.0 mΩ.

Similarly to the first inverter 120, the second inverter 130 (sometimes referred to as "bridge circuit R") includes a bridge circuit composed of three legs. FETs 131L, 132L, and 133L shown in FIG. 1 are low-side switching elements, and FETs 131H, 132H, and 133H are high-side switching elements. In addition, the second inverter 130 has three shunt resistances 131R, 132R, and 133R. These shunt resistances are connected between the three low-side switching elements included in the three legs and the GND. Each FET of the first and second inverters 120, 130 are controllable by, for example, the microcontroller or the dedicated driver.

Incidentally, a connection example of the shunt resistance is not limited to the above. For example, the three shunt resistances 121R, 122R, and 123R may be disposed between the FETs 121H, 122H, and 123H and the FET 111. Also, the number of shunt resistances for each inverter is not limited to three. For example, two shunt resistances 121R, 122R may be used for the first inverter 120. The number of shunt resistances to be used and arrangement of shunt resistances are appropriately determined in consideration of a product cost and the design specifications.

Figure 3:
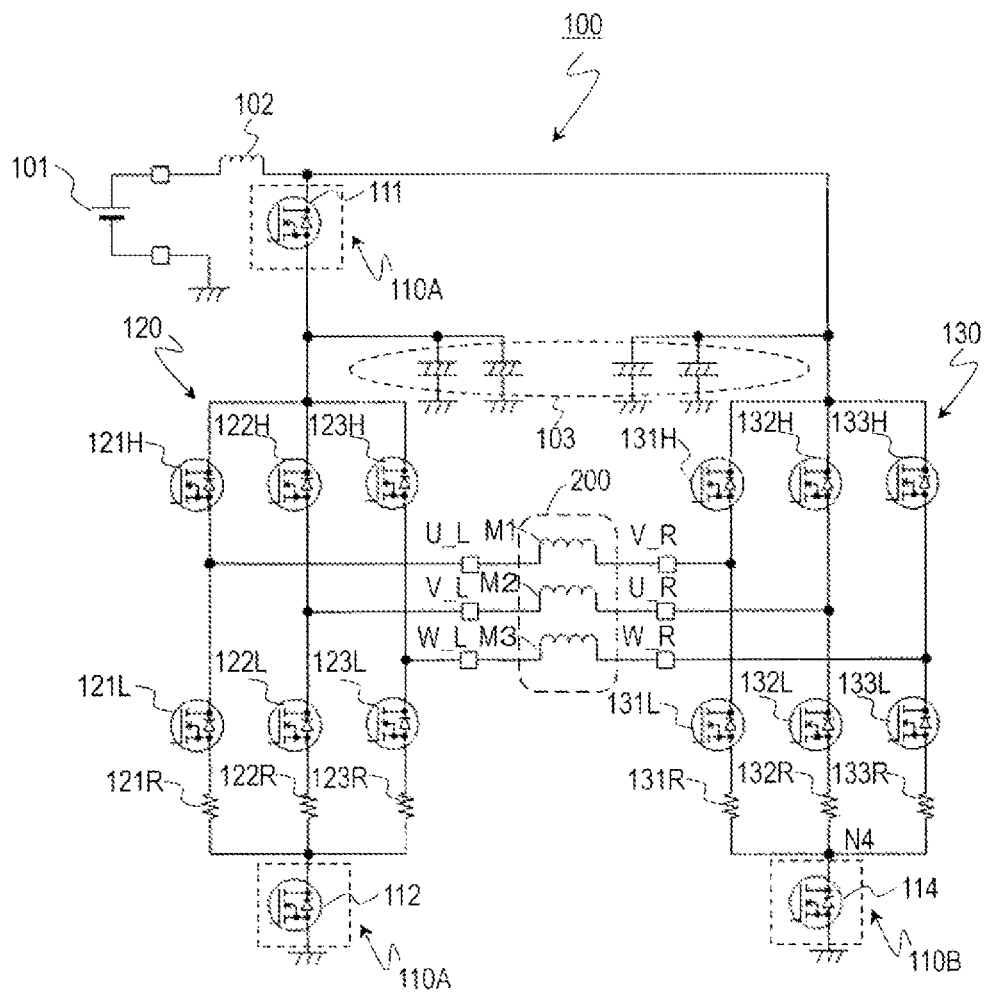
FIG. 3 is a circuit diagram illustrating a still another circuit configuration of the power conversion device 100 according to the first exemplary embodiment of the present disclosure.

FIG. 3 schematically illustrates still another circuit configuration of the power conversion device 100 according to the present exemplary embodiment.

As shown in FIG. 3, the switching circuit 110B for the second inverter 130 may have a fourth switch element (FET) 114 instead of the FET 113. The FET 114 switches connection/disconnection between the second inverter 130 and the GND. As described above, the switching circuit 110B according to the present exemplary embodiment may include the FET 113 or the FET 114.

Figure 4:
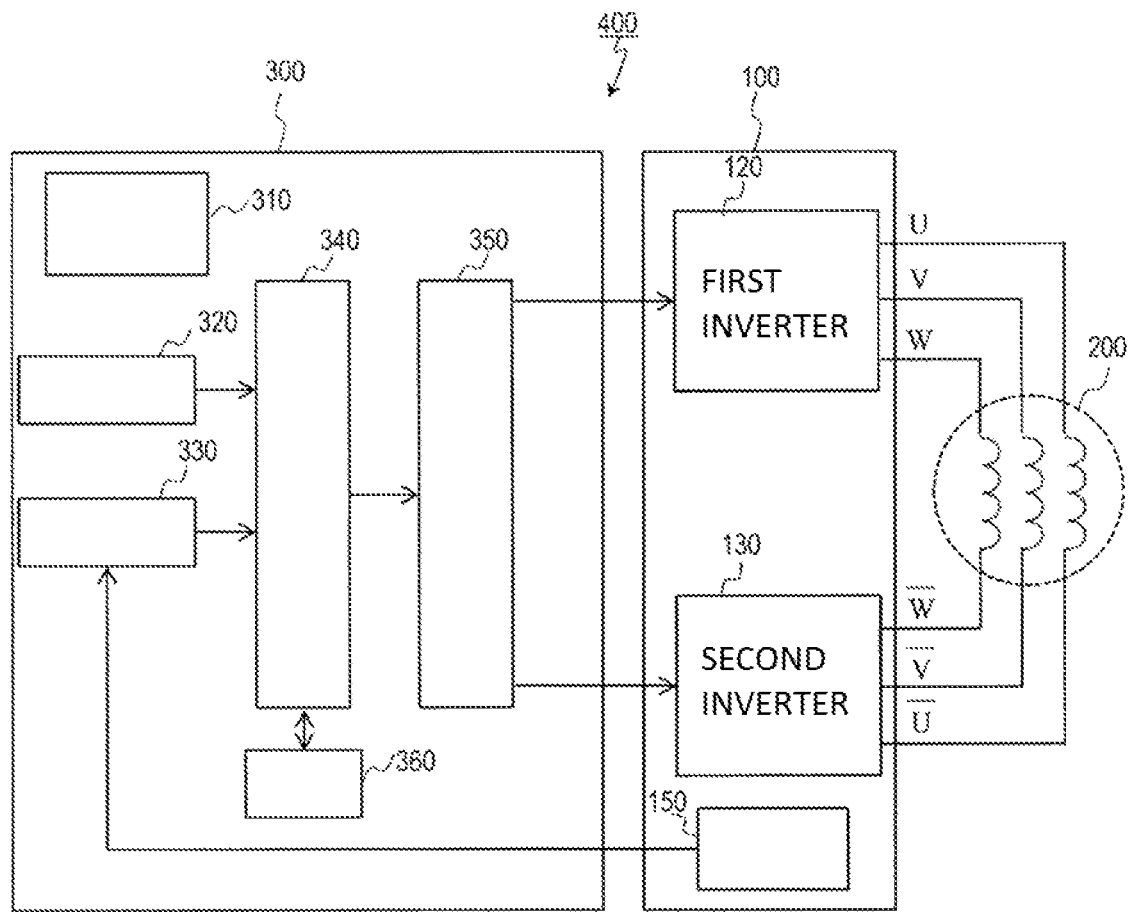
FIG. 4 is a block diagram illustrating a typical block configuration of a motor drive unit 400 having the power conversion device 100.

FIG. 4 schematically illustrates a typical block configuration of the motor drive unit 400 having the power conversion device 100.

The motor drive unit 400 includes the power conversion device 100, the motor 200, and a control circuit 300.

The control circuit 300 includes, for example, a power source circuit 310, an angle sensor 320, an input circuit 330, a microcontroller 340, a drive circuit 350, and a read-only memory (ROM) 360. The control circuit 300 is connected to the power conversion device 100 and drives the motor 200 by controlling the power conversion device 100. Specifically, the control circuit 300 realizes closed-loop control by controlling target motor torque and rotation speed.

The power source circuit 310 generates necessary DC voltages (for example, 3 V or 5 V) for each block in the circuit. The angle sensor 320 is, for example, a resolver or a Hall IC. The angle sensor 320 detects a rotation angle (hereinafter referred to as "rotation signal") of a rotor of the motor 200 and outputs a rotation signal to the microcontroller 340. The input circuit 330 receives a motor current value (hereinafter referred to as "actual current value") detected by the current sensor 150, converts a level of an actual current value into an input level of the microcontroller 340 as necessary, and outputs the actual current value to the microcontroller 340.

The microcontroller 340 controls switching operation (turn-on or turn-off) of each FET in the first and second inverters 120, 130 of the power conversion device 100. The microcontroller 340 sets a target current value according to the actual current value and the rotation signal of the rotor and so on to generate a PWM signal, and outputs it to the drive circuit 350. Further, the microcontroller 340 controls on or off of each FET in the switching circuits 110A, 110B of the power conversion device 100.

The drive circuit 350 is typically a gate driver. The drive circuit 350 generates a control signal (gate control signal) for controlling the switching operation of each FET in the first and second inverters 120, 130 in accordance with the PWM signal and provides the control signal to a gate of each FET. Further, the drive circuit 350 generates a control signal (gate control signal) for controlling on or off of each FET in the switching circuits 110A, 110B in accordance with an instruction from the microcontroller 340 and provides the control signal to the gate of each FET. However, the microcontroller 340 may have the function of the drive circuit 350. In that case, the control circuit 300 may not have the drive circuit 350.

The ROM 360 is, for example, a writable memory (for example, a programmable read-only memory (PROM)), a rewritable memory (for example, a flash memory), or a read-only memory. The ROM 360 stores a control program including an instruction group for causing the microcontroller 340 to control the power conversion device 100. For example, the control program is once expanded in a random-access memory (RAM) (not shown) at a boot time.

The power conversion device 100 has an operation (control) mode in the normal state and in the abnormal state. The power conversion device 100 switches the operation mode from a normal state operation mode to an abnormal state operation mode. Specifically, the control circuit 300 (mainly the microcontroller 340) switches power conversion control from control in the normal state to control in the abnormal state. According to the control mode and a failure pattern of the FET, on/off states of each FET in the switching circuits 110A, 110B and the first and second inverters 120, 130 are determined.

First, a specific example of the normal state operation (control method) of the power conversion device 100 will be described. As described above, normal refers to a state in which each FET of the first and second inverters 120, 130 is not in failure. In the normal state, the control circuit 300 performs power conversion using a neutral point of the winding of each phase formed in the second inverter 130 and the first inverter 120.

The control circuit 300 turns on the FETs 111, 112 of the switching circuit 110A. As a result, the power source 101 and the first inverter 120 are electrically connected to each other, and the first inverter 120 and the GND are electrically connected to each other. Further, the control circuit 300 turns off the FET 113 of the switching circuit 110B. As a result, the power source 101 and the second inverter 130 are electrically disconnected. In this connection state, the control circuit 300 turns on the high-side switching elements 131H, 132H, and 133H and turns off the low-side switching elements 131L, 132L, and 133L in the second inverter 130. As a result, a high-side node N1 (see FIG. 1) of the second inverter 130 functions as a neutral point of each winding. In the specification of the present application, the fact that a node functions as the neutral point is expressed as "a neutral point is configured". The power conversion device 100 performs the power conversion using a neutral point N1 and the first inverter 120.

In the control in the normal state, the first inverter 120 functions as a drive inverter for performing the switching operation of each FET, and the second inverter 130 functions as a neutral point inverter in which the neutral point is configured.

According to the power conversion device 100 shown in FIG. 3, the control circuit 300 turns on the FETs 111, 112, turns off the FET 114, turns off the high-side switching elements 131H, 132H, and 133H, and turns on the low-side switching elements 131L, 132L, and 133L in the second inverter 130. As a result, a low-side node N3 of the second inverter 130 functions as the neutral point of each winding. The power conversion device 100 performs the power conversion using a neutral point N4 and the first inverter 120.

Figure 5:
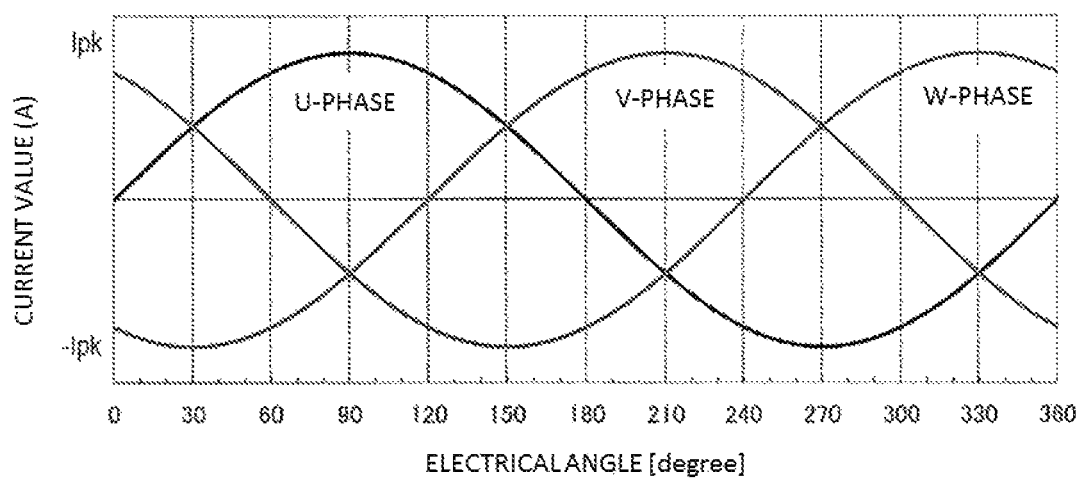
FIG. 5 is a graph exemplifying a current waveform obtained by plotting current values flowing through a winding of each of U-phase, V-phase, and W-phase of a motor 200 when the power conversion device 100 is controlled in a normal state.

FIG. 5 exemplifies a current waveform obtained by plotting current values flowing through each of the U-phase, V-phase, and W-phase windings of the motor 200 when the power conversion device 100 is controlled in the normal state. A horizontal axis shows a motor electrical angle (deg), and a vertical axis shows the current value (A). In the current waveform of FIG. 5, the current value is plotted at every electrical angle of 30°. $I_{pk}$ represents a maximum current value (peak current value) of each phase. In addition to a sine wave exemplified in FIG. 5, the motor 200 is drivable using, for example, a rectangular wave.

Table 1 shows the current values flowing through the terminals of each inverter at every electrical angle in the sine wave of FIG. 5. Specifically, Table 1 shows the current values flowing through the terminals U_L, V_L and W_L of the first inverter 120 (bridge circuit L) at every electrical angle of 30°. In the specification of the present application, with respect to the bridge circuit L, a current direction flowing from the terminal of the bridge circuit L to the terminal of the bridge circuit R is defined as a positive direction. The current direction shown in FIG. 5 follows this definition. Further, with respect to the bridge circuit R, a current direction flowing from the terminal of the bridge circuit R to the terminal of the bridge circuit L is defined as a positive direction. Therefore, phase difference between the current of the bridge circuit L and the current of the bridge circuit R is 180°. In Table 1, magnitude of the current value $I_1$ is $[(3)^{1/2}/2]*I_{pk}$ and magnitude of the current value $I_2$ is $I_{pk}/2$. Depending on the definition of the current direction, positive and negative signs of the current values shown in FIG. 5 can be an opposite relation (phase difference 180°) to those of the current values shown in Table 1.

At an electrical angle of 150°, a current having the magnitude $I_2$ flows through the U-phase winding M1 from the bridge circuit L to the bridge circuit R, a current having the magnitude $I_2$ flows through the V-phase winding M2 from the bridge circuit L to the bridge circuit R, and a current having the magnitude $I_{pk}$ flows through the W-phase winding M3 from the bridge circuit R to the bridge circuit L.

At an electrical angle of 180°, no current flows through the U-phase winding M1. A current having the magnitude $I_1$ flows through the V-phase winding M2 from the bridge circuit L to the bridge circuit R, and a current having the magnitude $I_1$ flows through the W-phase winding M3 from the bridge circuit R to the bridge circuit L.

At an electrical angle of 210°, a current having the magnitude $I_2$ flows through the U-phase winding M1 from the bridge circuit R to the bridge circuit L, a current having the magnitude $I_{pk}$ flows through the V-phase winding M2 from the bridge circuit L to the bridge circuit R, and a current

TABLE 1

| NORMAL STATE | | ELECTRICAL ANGLE [degree] | | | | | | | | | | |
|---|---|---|---|---|---|---|---|---|---|---|---|---|
| OPERATION | | 0 (360) | 30 | 60 | 90 | 120 | 150 | 180 | 210 | 240 | 270 | 300 | 330 |
| BRIDGE CIRCUIT L | U_L PHASE | 0 | $I_2$ | $I_1$ | Ipk | $I_1$ | $I_2$ | 0 | $-I_2$ | $-I_1$ | $-$Ipk | $-I_1$ | $-I_2$ |
| | V_L PHASE | $-I_1$ | $-$Ipk | $-I_1$ | $-I_2$ | 0 | $I_2$ | $I_1$ | Ipk | $I_1$ | $I_2$ | 0 | $-I_2$ |
| | W_L PHASE | $I_1$ | $I_2$ | 0 | $-I_2$ | $-I_1$ | $-$Ipk | $-I_1$ | $-I_2$ | 0 | $I_2$ | $I_1$ | Ipk |

At an electrical angle of 0°, no current flows through the U-phase winding M1. A current having the magnitude $I_1$ flows through the V-phase winding M2 from the bridge circuit R to the bridge circuit L, and a current having the magnitude $I_1$ flows through the W-phase winding M3 from the bridge circuit L to the bridge circuit R.

At an electrical angle of 30°, a current having the magnitude $I_2$ flows through the U-phase winding M1 from the bridge circuit L to the bridge circuit R, a current having the magnitude $I_{pk}$ flows through the V-phase winding M2 from the bridge circuit R to the bridge circuit L, and a current having the magnitude $I_2$ flows through the W-phase winding M3 from the bridge circuit L to the bridge circuit R.

At an electrical angle of 60°, a current having the magnitude $I_1$ flows through the U-phase winding M1 from the bridge circuit L to the bridge circuit R, and a current having the magnitude $I_1$ flows through the V-phase winding M2 from the bridge circuit R to the bridge circuit L. No current flows through the W-phase winding M3.

At the electrical angle of 90°, a current having the magnitude $I_{pk}$ flows through the U-phase winding M1 from the bridge circuit L to the bridge circuit R, a current having the magnitude $I_2$ flows through the V-phase winding M2 from the bridge circuit R to the bridge circuit L, and a current having the magnitude $I_2$ flows through the W-phase winding M3 from the bridge circuit R to the bridge circuit L.

At an electrical angle of 120°, a current having the magnitude $I_1$ flows through the U-phase winding M1 from the bridge circuit L to the bridge circuit R, and a current having the magnitude $I_1$ flows through the W-phase winding M3 from the bridge circuit R to the bridge circuit L. No current flows through the V-phase winding M2.

having the magnitude $I_2$ flows through the W-phase winding M3 from the bridge circuit R to the bridge circuit L.

At an electrical angle of 240°, a current having the magnitude $I_1$ flows through the U-phase winding M1 from the bridge circuit R to the bridge circuit L, and a current having the magnitude $I_1$ flows through the V-phase winding M2 from the bridge circuit L to the bridge circuit R. No current flows through the W-phase winding M3.

At an electrical angle of 270°, a current having the magnitude $I_{pk}$ flows through the U-phase winding M1 from the bridge circuit R to the bridge circuit L, a current having the magnitude $I_2$ flows through the V-phase winding M2 from the bridge circuit L to the bridge circuit R, and a current having the magnitude $I_2$ flows through the W-phase winding M3 from the bridge circuit L to the bridge circuit R.

At an electrical angle of 300°, a current having the magnitude $I_1$ flows through the U-phase winding M1 from the bridge circuit R to the bridge circuit L, and a current having the magnitude $I_1$ flows through the W-phase winding M3 from the bridge circuit L to the bridge circuit R. No current flows through the V-phase winding M2.

At an electrical angle of 330°, a current having the magnitude $I_2$ flows through the U-phase winding M1 from the bridge circuit R to the bridge circuit L, a current having the magnitude $I_2$ flows through the V-phase winding M2 from the bridge circuit R to the bridge circuit L, and a current having the magnitude $I_{pk}$ flows through the W-phase winding M3 from the bridge circuit L to the bridge circuit R.

According to the power conversion control using the neutral point, the sum of the currents flowing through the three-phase windings taking the current direction into consideration is always "0" for every electrical angle. For example, the control circuit 300 controls the switching operation of each FET of the bridge circuit L by vector control in which the current waveform shown in FIG. 5 is obtained.

Figure 6:
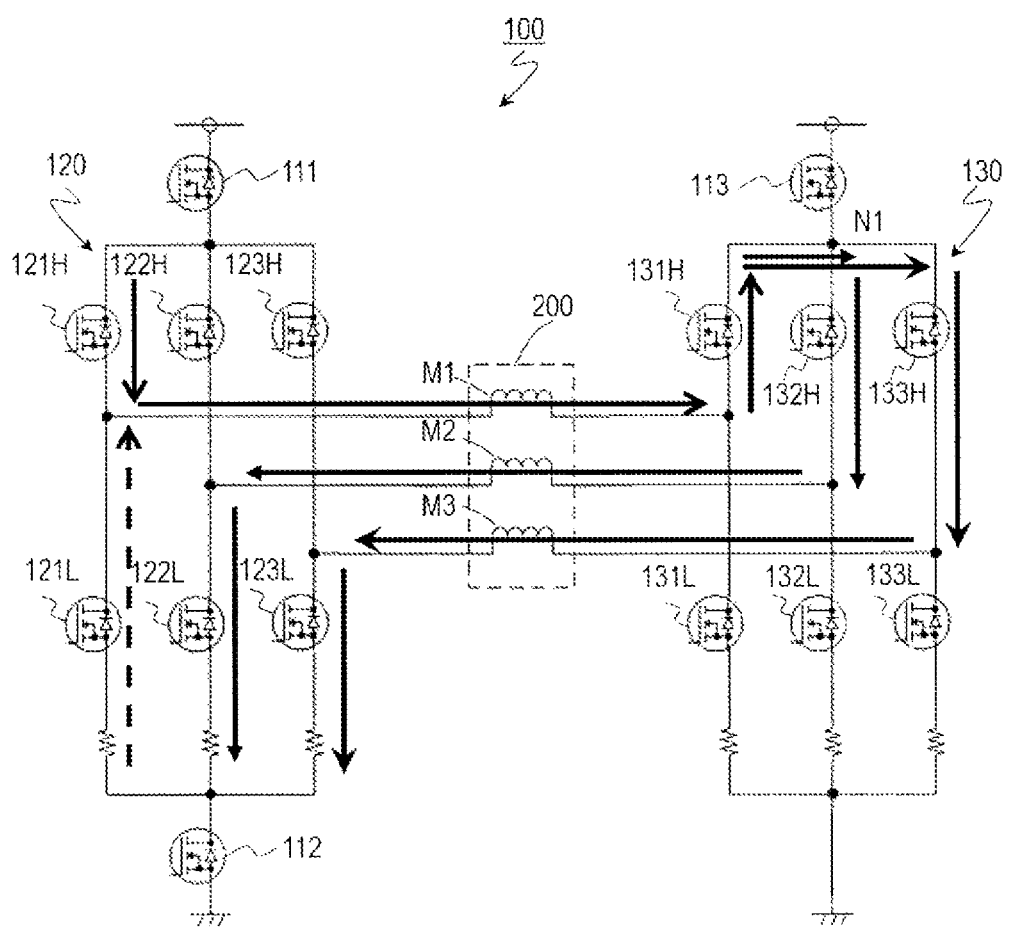
FIG. 6 is a schematic diagram illustrating current flow in the power conversion device 100 at a motor electrical angle of, for example, 90° in the normal state.

FIG. 6 schematically illustrates flow of currents in the power conversion device 100 at, for example, the motor electrical angle of 90° in the normal state. Each of three solid lines represents the current flowing from the power source 101 to the motor 200, and a broken line represents a regenerative current returning to the winding M1 of the motor 200.

In a state shown in FIG. 6, in the first inverter 120, the FETs 121H, 122L, and 123L are in ON state, and the FETs 121L, 122H, and 123H are in OFF state. A current flowing through the FET 121H of the first inverter 120 flows through the winding M1 and the FET 131H of the second inverter 130 into the neutral point N1. A part of the current flows through the FET 132H into the winding M2 and the remaining current flows through the FET 133H into the winding M3. The currents flowing through the windings M2 and M3 flow into the GND of a side of the first inverter 120. In addition, a regenerative current flows through the freewheel diode of the FET 121L toward the winding M1 of the motor 200.

Since the power source 101 and the second inverter 130 are electrically disconnected from each other, no current flows from the power source 101 into the neutral point N1 of the second inverter 130. In addition, since the low-side switching elements 131L, 132L, and 133L of the second inverter 130 are all in the OFF state, the currents flowing through the neutral point N1 do not flow into the GND. Thereby, by using the switching circuits 110A, 110B (specifically, the three FETs 111, 112, and 113 (or 114)) in the control in the normal state, power loss is suppressed, and current control is appropriately performable by forming a closed loop of a drive current.

As described above, abnormality mainly means that a failure has occurred in the FET. Failures of the FET are roughly divided into "open failure" and "short-circuit failure". "Open failure" refers to a failure in which source-drain of the FET opens (in other words, resistance rds between the source and the drain becomes high impedance), and "short-circuit failure" refers to a failure in which the source-drain of the FET short-circuits.

Referring to FIG. 1 again. At a time of operation of the power conversion device 100, normally, it is considered that a random failure in which one FET in the 16 FETs randomly fails occurs. The present disclosure is mainly directed to a control method of the power conversion device 100 in a case where the random failure occurs in the first inverter 120 having the power source side and GND side switching circuits. However, the present disclosure is also directed to a control method of the power conversion device 100 in a case where a plurality of the FETs fail in a chain fashion and so on. A chain-like failure means failures occurring simultaneously in, for example, the high-side switching element and the low-side switching element of one leg.

When the power conversion device 100 is used for a long period of time, it is possible that the random failure occurs in the first inverter 120. Incidentally, the random failure is different from a manufacturing failure that occurs during manufacturing. When one of the plurality of FETs of the first inverter 120 fails, the control in the normal state by the switching operation of each FET of the first inverter 120 is no longer performed.

As an example of failure detection, the drive circuit 350 monitors a drain-source voltage Vds of each of the FETs, and detects the failure of the FET by comparing a predetermined threshold voltage with Vds. The threshold voltage is set in the drive circuit 350 by, for example, data communication with an external integrated circuit (IC; not shown) and external components. The drive circuit 350 is connected to a port of the microcontroller 340 and notifies the microcontroller 340 of a failure detection signal. For example, the drive circuit 350 asserts the failure detection signal when the failure of the FET is detected. When the asserted failure detection signal is received, the microcontroller 340 reads internal data of the drive circuit 350 and distinguishes which FET has failed among the plurality of FETs.

As another example of the failure detection, the microcontroller 340 also detects the failure of the FET based on difference between the actual current value and the target current value of the motor. However, the failure detection is not limited to the above methods, and any known method related to the failure detection may be widely used.

When the failure detection signal is asserted, the microcontroller 340 switches the control of the power conversion device 100 from the control in the normal state to the control in the abnormal state. For example, a timing at which the control is switched from the normal state to the abnormal state is about 10 msec to 30 msec after the failure detection signal is asserted.

Various failure patterns exist in the failure of the power conversion device 100. Hereinafter, the failure patterns are divided into cases, and the control in the abnormal state of the power conversion device 100 will be described in detail for each pattern. In the present embodiment, as described above, the first inverter 120 is handled as the failed inverter. The power conversion device 100 performs the power conversion using the neutral point of the winding of each phase in the first inverter 120 and the second inverter 130.

Contrary to the control in the normal state, in the control in the abnormal state, the second inverter 130 functions as the drive inverter for performing the switching operation of each FET, and the first inverter 120 functions as the neutral point inverter in which the neutral point is configured.

Control in the abnormal state in a case in which the three high-side switching elements include the switching element having an open failure in the bridge circuit L of the first inverter 120 will be described.

It is assumed that the open failure occurs in the FET 121H among the high-side switching elements (the FETs 121H, 122H, and 123H) of the first inverter 120. In addition, even when the FET 122H or 123H has the open failure, the power conversion device 100 is controllable by a control method described below.

The control circuit 300 sets the FETs 111, 112, and 113 of the switching circuits 110A, 110B and the FETs 122H, 123H, 121L, 122L, and 123L of the first inverter 120 into a first state. In the first state, the FETs 111, 112 of the switching circuit 110A are turned off and the FET 113 of the switching circuit 110B is turned on. In addition, the FETs 122H, 123H (high-side switching elements different from the failed FET 121H) other than the failed FET 121H of the first inverter 120 are turned off and the FETs 121L, 122L, and 123L are turned on.

In the first state, the first inverter 120 is electrically disconnected from the power source 101 and the GND, and the second inverter 130 is electrically connected to the power source 101 and the GND. In other words, when the first inverter 120 is abnormal, the FET 111 cuts off connection between the power source 101 and the first inverter 120, and the FET 112 cuts off connection between the first inverter 120 and the GND. In addition, by turning on all three low-side switching elements, a low-side node N2 (see FIG. 1) functions as the neutral point of each winding. In other words, a neutral point N2 is formed on a low side of the first inverter 120. The power conversion device 100 drives the motor 200 using the neutral point N2 and the second inverter 130.

Figure 7:
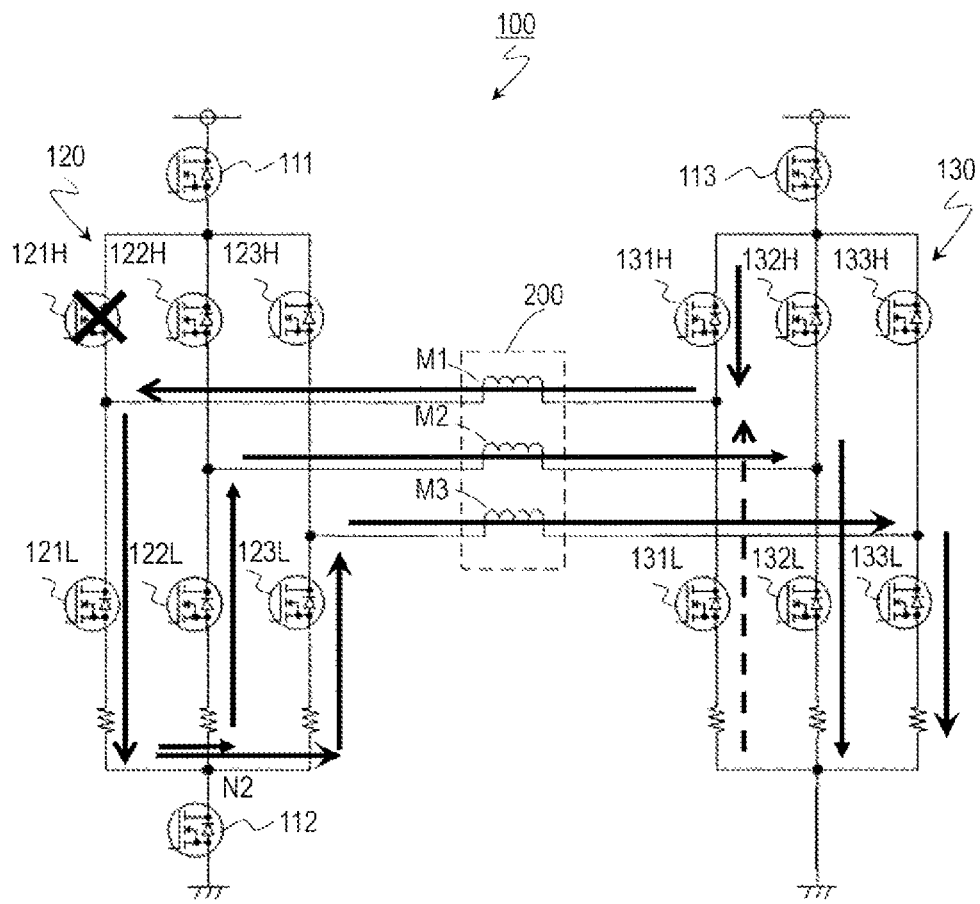
FIG. 7 is a schematic diagram illustrating the current flow in the power conversion device 100 when each of field effect transistors (FETs) of switching circuits 110A, 110B and a first inverter 120 is in a first state.
Figure 8:
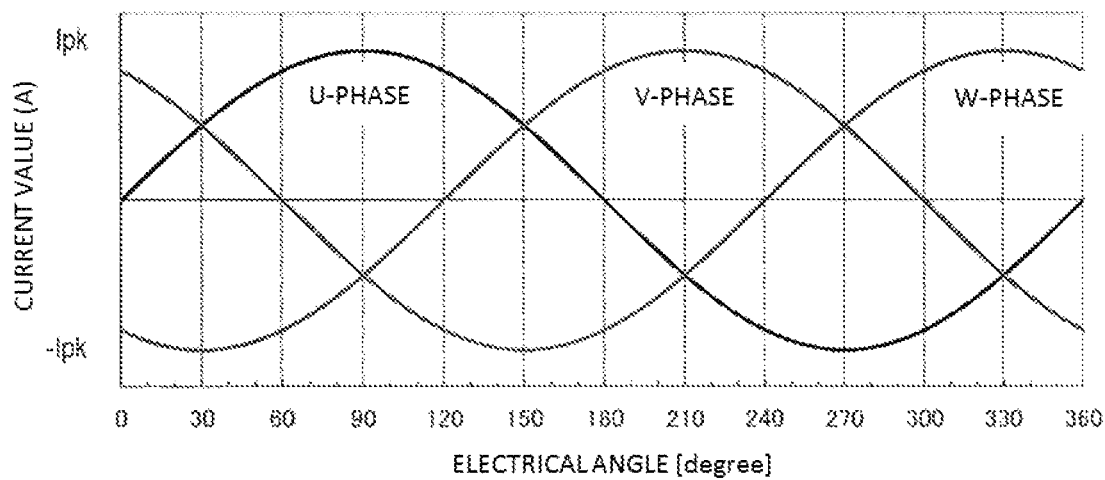
FIG. 8 is a graph exemplifying a current waveform obtained by plotting the current values flowing through the winding of each of the U-phase, the V-phase, and the W-phase of the motor 200 when the power conversion device 100 is controlled in the first state.

FIG. 7 schematically illustrates the flow of currents in the power conversion device 100 when each of the FETs of the switching circuits 110A, 110B and the first inverter 120 is in the first state. FIG. 8 exemplifies the current waveform obtained by plotting the current values flowing through each of the U-phase, V-phase, and W-phase windings of the motor 200 when the power conversion device 100 is controlled in the first state. FIG. 7 illustrates the flow of the currents at, for example, the motor electrical angle of 270°. Each of three solid lines represents the current flowing from the power source 101 to the motor 200, and a broken line represents a regenerative current returning to the winding M1 of the motor 200.

According to the state shown in FIG. 7, in the second inverter 130, the FETs 131H, 132L, and 133L are in the ON state, and the FETs 131L, 132H, and 133H are in the OFF state. A current flowing through the FET 131H of the second inverter 130 flows through the winding M1 and the FET 121L of the first inverter 120 into the neutral point N2. A part of the current flows through the FET 122L into the winding M2, and the remaining current flows through the FET 123L into the winding M3. The currents flowing through the windings M2 and M3 flow into the GND on a side of the second inverter 130. Further, a regenerative current flows through the freewheel diode of the FET 131L toward the winding M1 of the motor 200.

Table 2 exemplifies current values flowing through the terminals of the second inverter 130 for each electrical angle in the current waveform of FIG. 8. Specifically, Table 2 exemplifies the current values flowing through the terminals U_R, V_R, and W_R of the second inverter 130 (bridge circuit R) at every electrical angle of 30°. The definition of the current direction is as described above, and the positive and negative signs of the current values shown in FIG. 8 are opposite to those of the current values shown in Table 2 (phase difference 180°).

current flows through the W-phase winding M3. The sum of the currents flowing into the neutral point and flowing out from the neutral point is always "0" for every electrical angle. The control circuit 300 controls the switching operation of each FET of the bridge circuit R by the vector control in which, for example, the current waveform shown in FIG. 8 is obtained.

As shown in Table 1 and Table 2, it can be seen that the motor current flowing through the motor 200 does not change between the control in the normal state and the control in the abnormal state for every electrical angle. For this reason, an assist torque of the motor is not reduced in the control in the abnormal state, as compared with the control in the normal state.

Since the power source 101 and the first inverter 120 are electrically disconnected from each other, no current flows from the power source 101 into the first inverter 120. Also, since the first inverter 120 and the GND are electrically disconnected from each other, the current flowing through the neutral point N2 does not flow into the GND. Thus, the power loss is suppressed, and the current control is appropriately performable by forming the closed loop of the drive current.

When the high-side switching element (for example, the FET 121H) has the open failure, the state of each of the FETs of the switching circuits 110A, 110B and the first inverter 120 is not limited to the first state. For example, the control circuit 300 may set these FETs into a second state. In the second state, the FET 111 of the switching circuit 110A is turned on, the FET 112 is turned off, and the FET 113 is turned on. In addition, the FETs 122H, 123H other than the failed FET 121H of the first inverter 120 are turned off, and the FETs 121L, 122L, and 123L are turned on. Difference between the first state and the second state is whether or not the FET 111 is turned on. Reason why the FET 111 may be turned on is that when the FET 121H has the open failure, all the high-side switching elements are brought into the open state by controlling the FETs 122H, 123H to be in the OFF state, and even though the FET 111 is turned on, no current flows from the power source 101 into the first

TABLE 2

| ABNORMAL STATE | | ELECTRICAL ANGLE [degree] | | | | | | | | | | | |
| --- | --- | --- | --- | --- | --- | --- | --- | --- | --- | --- | --- | --- | --- |
| OPERATION | | 0 (360) | 30 | 60 | 90 | 120 | 150 | 180 | 210 | 240 | 270 | 300 | 330 |
| BRIDGE CIRCUIT R | U_R PHASE | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R PHASE | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R PHASE | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at the electrical angle of 30°, a current having the magnitude $I_2$ flows through the U-phase winding M1 from the bridge circuit L to the bridge circuit R, and a current having the magnitude $I_{pk}$ flows through the V-phase winding M2 from the bridge circuit R to the bridge circuit L, and a current having the magnitude $I_2$ flows through the W-phase winding M3 from the bridge circuit L to the bridge circuit R. At an electrical angle of 60°, a current having the magnitude $I_1$ flows through the U-phase winding M1 from the bridge circuit L to the bridge circuit R, and a current having the magnitude $I_1$ flows through the V-phase winding M2 from the bridge circuit R to the bridge circuit L. No inverter 120. As described above, in an open failure state, the FET 111 may be in the ON state or in the OFF state.

Control in the abnormal state in a case in which the three high-side switching elements include the switching element having a short-circuit failure in the bridge circuit L of the first inverter 120 will be described.

It is assumed that the FET 121H has the short-circuit failure among the high-side switching elements (FETs 121H, 122H, and 123H) of the first inverter 120. In addition, even when the FET 122H or 123H has the short-circuit failure, the power conversion device 100 is controllable by a control method described below.

When the FET 121H has the short-circuit failure, the control circuit 300 sets the FETs 111, 112, and 113 of the switching circuits 110A, 110B and the FETs 122H, 123H, 121L, 122L, and 123L of the first inverter 120 into the first state. In the case of the short-circuit failure, when the FET 113 is turned on, a current flows from the power source 101 into the shorted FET 121H, so that the control in the second state is prohibited.

Like the open failure state, by turning on all three low-side switching elements, the neutral point N2 of each winding is formed at the low-side node N2. The power conversion device 100 drives the motor 200 using the neutral point N2 in the first inverter 120 and the second inverter 130. The control circuit 300 controls the switching operation of each FET of the bridge circuit R by the vector control in which, for example, the current waveform shown in FIG. 8 is obtained. For example, in the first state in a short-circuit failure state, the flow of currents flowing in the power conversion device 100 at the electrical angle of 270° is as shown in FIG. 7, and current values flowing in each winding for each motor electrical angle are as shown in Table 2.

In the case where the FET 121H has the short-circuit failure, for example, in the first state of each FET shown in FIG. 7, a regenerative current flows through the freewheel diode of the FET 122H into the FET 121H when the motor electrical angle in Table 2 is 0° to 120°, a regenerative current flows through the freewheel diode of the FET 123H into the FET 121H when the motor electrical angle in Table 2 is 60° to 180°. In this way, in the case of the short-circuit failure, the current is dispersed through the FET 121H in a certain range of the motor electrical angle.

According to this control, since the power source 101 and the first inverter 120 are electrically disconnected from each other, no current flows from the power source 101 into the first inverter 120. Also, since the first inverter 120 and the GND are electrically disconnected from each other, the current flowing through the neutral point N2 does not flow into the GND.

Control in the abnormal state in a case in which the three low-side switching elements include the switching element having the open failure in the bridge circuit L of the first inverter 120 will be described.

It is assumed that the open failure occurs in the FET 121L among the low-side switching elements (FETs 121L, 122L, and 123L) of the first inverter 120. Even though the FET 122L or 123L has the open failure, the power conversion device 100 is controllable by a control method described below.

When the FET 121L has the open failure, the control circuit 300 sets the FETs 111, 112, and 113 of the switching circuits 110A, 110B and the FETs 121H, 122H, 123H, 122L, and 123L of the first inverter 120 into a third state. In the third state, the FETs 111, 112 of the switching circuit 110A are turned off, and the FET 113 of the switching circuit 110B is turned on. In addition, the FETs 122L, 123L (the low-side switching elements different from the failed 121L) other than the failed FET 121L of the first inverter 120 are turned off, and the FETs 121H, 122H, and 123H are turned on.

In the third state, the first inverter 120 is electrically disconnected from the power source 101 and the GND, and the second inverter 130 is electrically connected to the power source 101 and the GND. Further, by turning on all the three high-side switching elements of the first inverter 120, a neutral point N3 of each winding is formed at a high-side node N3 (see FIG. 1).

Figure 9:
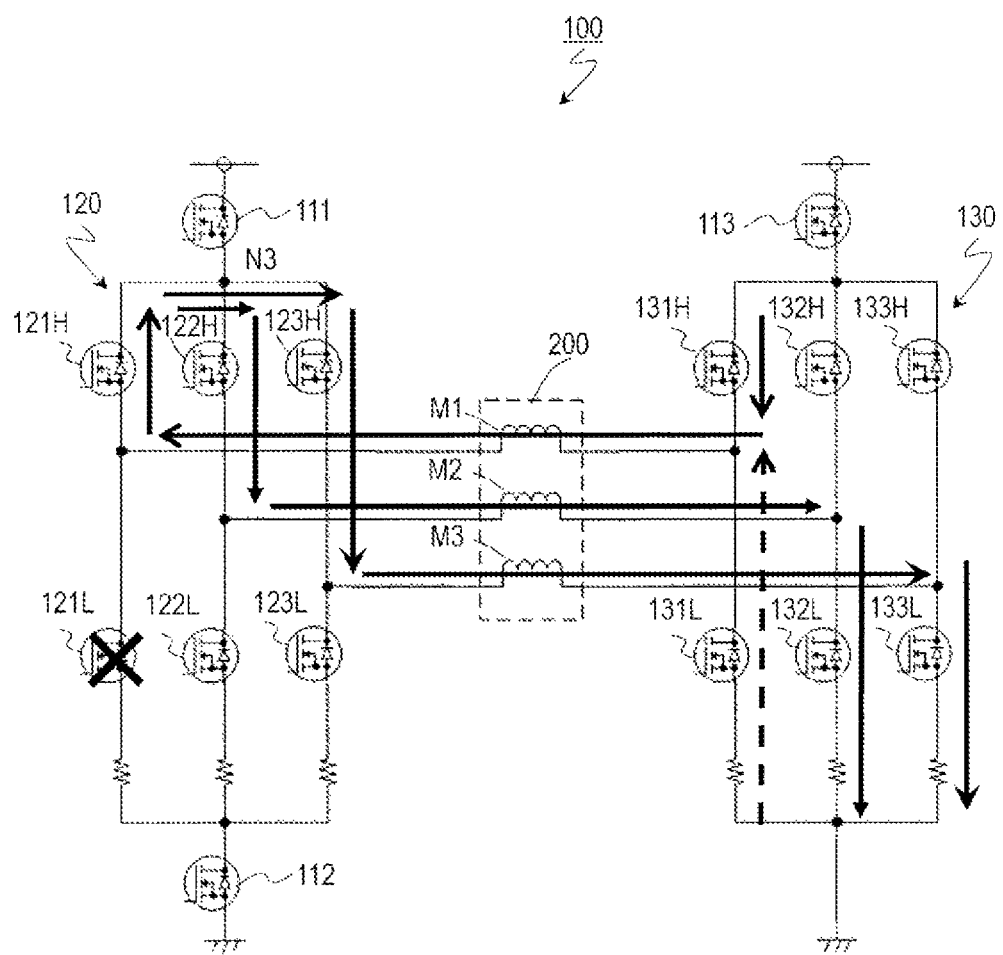
FIG. 9 is a schematic diagram illustrating the current flow in the power conversion device 100 when each of the FETs of the switching circuits 110A, 110B and the first inverter 120 is in a third state.

FIG. 9 schematically illustrates the flow of currents in the power conversion device 100 when each of the FETs of the switching circuits 110A, 110B and the first inverter 120 is in the third state. FIG. 9 illustrates the flow of currents at, for example, the motor electrical angle of 270°. Each of three solid lines represents the current flowing from the power source 101 to the motor 200, and a broken line represents a regenerative current returning to the winding M1 of the motor 200.

In the state shown in FIG. 9, in the second inverter 130, the FETs 131H, 132L, and 133L are in the ON state, and the FETs 131L, 132H, and 133H are in the OFF state. The current flowing through the FET 131H of the second inverter 130 flows through the winding M1 and the FET 121H of the first inverter 120 into the neutral point N3. A part of that current flows through the FET 122H into the winding M2, and the remaining current flows through the FET 123H into the winding M3. The currents flowing through the windings M2 and M3 flow into the GND on a side of the second inverter 130. Further, a regenerative current flows through the freewheel diode of the FET 131L toward the winding M1 of the motor 200. For example, current values flowing through each winding for each motor electrical angle are as shown in Table 2.

The power conversion device 100 drives the motor 200 using the neutral point N3 in the first inverter 120 and the second inverter 130. The control circuit 300 controls the switching operation of each FET of the bridge circuit R by the vector control in which, for example, the current waveform shown in FIG. 8 is obtained.

According to this control, since the power source 101 and the first inverter 120 are electrically disconnected from each other, no current flows from the power source 101 into the neutral point N3 of the first inverter 120. In addition, since the first inverter 120 and the GND are electrically disconnected from each other, no current flows from the first inverter 120 into the GND.

When the low-side switching element (for example, the FET 121L) has the open failure, the state of each of the FETs of the switching circuits 110A, 110B and the first inverter 120 is not limited to the third state. For example, the control circuit 300 may set these FETs into a fourth state. In the fourth state, the FET 111 of the switching circuit 110A is turned off, the FET 112 is turned on, and the FET 113 is turned on. In addition, the FETs 122L, 123L other than the failed FET 121L of the first inverter 120 are turned off, and the FETs 121H, 122H, and 123H are turned on. Difference between the third state and the fourth state is whether or not the FET 112 is on. Reason why the FET 112 may be turned on is that when the FET 121L has the open failure, all the low-side switching elements are brought into the open state by controlling the FETs 122L, 123L to be in the OFF state, and even though the FET 111 is turned on, no current flows into the GND. As described above, in the open failure state, the FET 112 may be in the ON state or in the OFF state.

Control in the abnormal state in a case in which the three low-side switching elements include the switching element having the short-circuit failure in the bridge circuit R of the first inverter 120 will be described.

It is assumed that the FET 121L has the short-circuit failure among the low-side switching elements (FETs 121L, 122L, and 123L) of the first inverter 120. Even when the FET 122L or 123L has the short-circuit failure, the power conversion device 100 is controllable by a control method described below.

When the FET 121L has the short-circuit failure, like the open failure state, the control circuit 300 sets the FETs 111, 112, and 113 of the switching circuits 110A, 110B and the FETs 121H, 122H, 123H, 122L, and 123L of the first inverter 120 into the third state. In the case of the short-circuit failure, when the FET 111 is turned on, a current flows from the shorted FET 121L into the GND, so that the control in the fourth state is prohibited.

Figure 10:
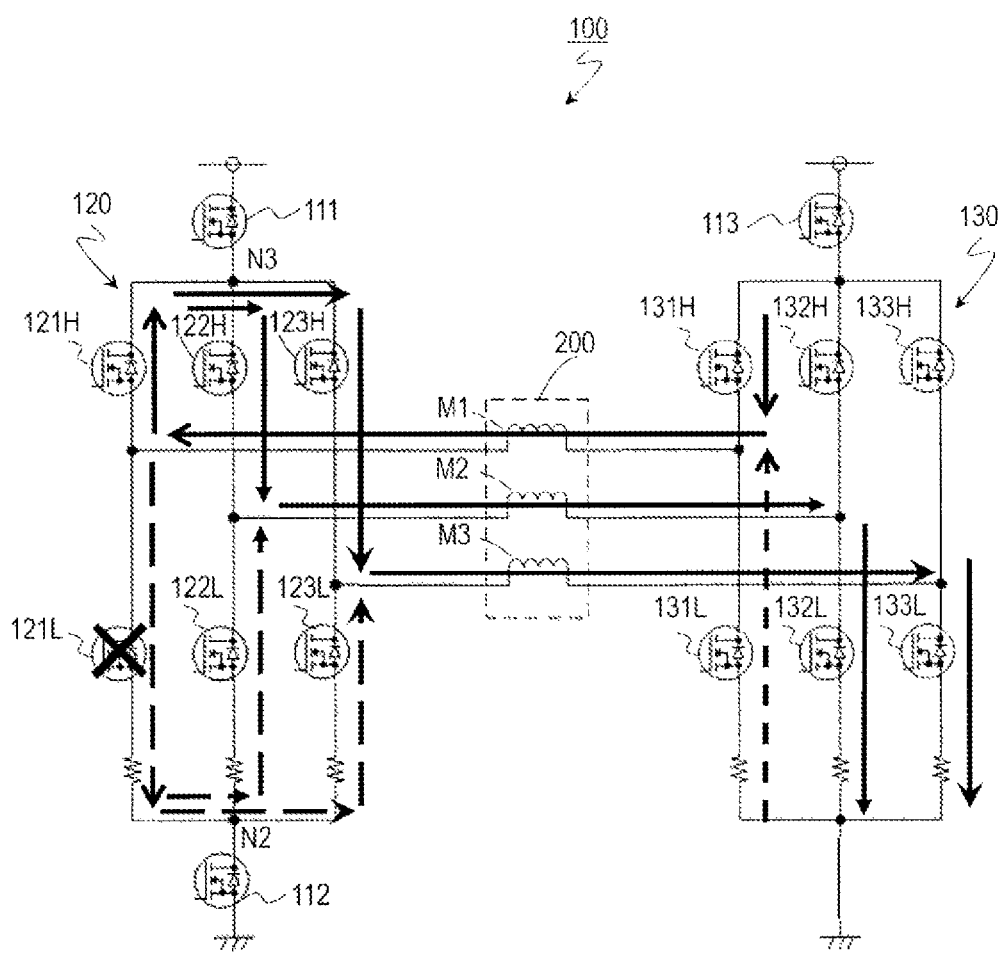
FIG. 10 is a schematic diagram illustrating the current flow in the power conversion device 100 when each of the FETs of the switching circuits 110A, 110B and the first inverter 120 is in the third state.

FIG. 10 schematically illustrates the flow of currents in the power conversion device 100 when each of the FETs of the switching circuits 110A, 110B and the first inverter 120 is in the third state. FIG. 10 illustrates the flow of currents at, for example, the motor electrical angle of 270°. Each of three solid lines represents the current flowing from the power source 101 to the motor 200, long broken lines represent the current flowing through the FET 121L, and a short broken line represents a regenerative current returning to the winding M1 of the motor 200.

In the state shown in FIG. 10, in the second inverter 130, the FETs 131H, 132L, and 133L are in the ON state, and the FETs 131L, 132H, and 133H are in the OFF state. The current flowing through the FET 131H of the second inverter 130 flows through the winding M1 and the FET 121H of the first inverter 120 into the neutral point N3. A part of that current flows through the FET 122H into the winding M2, and the remaining current flows through the FET 123H into the winding M3. The currents flowing through the windings M2 and M3 flow into the GND on a side of the second inverter 130. Further, a regenerative current flows through the freewheel diode of the FET 131L toward the winding M1 of the motor 200. Furthermore, unlike the open failure, in the short-circuit failure, a current flows from the shorted FET 121L to the low-side node N2. A part of the current flows through the freewheel diode of the FET 122L into the winding M2, and the remaining current flows through the freewheel diode of the FET 123L into the winding M3. The currents flowing through the windings M2 and M3 flow into the GND on the side of the second inverter 130.

For example, current values flowing through each winding for each motor electrical angle are as shown in Table 2. The power conversion device 100 drives the motor 200 using the neutral points N2, N3 in the first inverter 120 and the second inverter 130. The control circuit 300 controls the switching operation of each FET of the bridge circuit R by the vector control in which, for example, the current waveform shown in FIG. 8 is obtained.

According to this control, since the power source 101 and the first inverter 120 are electrically disconnected from each other, no current flows from the power source 101 into the neutral point N3 of the first inverter 120. In addition, since the first inverter 120 and the GND are electrically disconnected from each other, no current flows from the first inverter 120 into the GND.

According to the present embodiment, by using the three FETs 111, 112, and 113 (or 114) in the switching circuits 110A, 110B, the power loss is suppressed in both the control in the normal state and the control in the abnormal state, and the current control is appropriately performable by forming the closed loop of the drive current.

Hereinafter, the power conversion device 100A according to variations of the present embodiment will be described. The switching circuit 110A for the first inverter 120 of the present disclosure may have at least one of the first and second switch elements 111, 112.

Figure 11A:
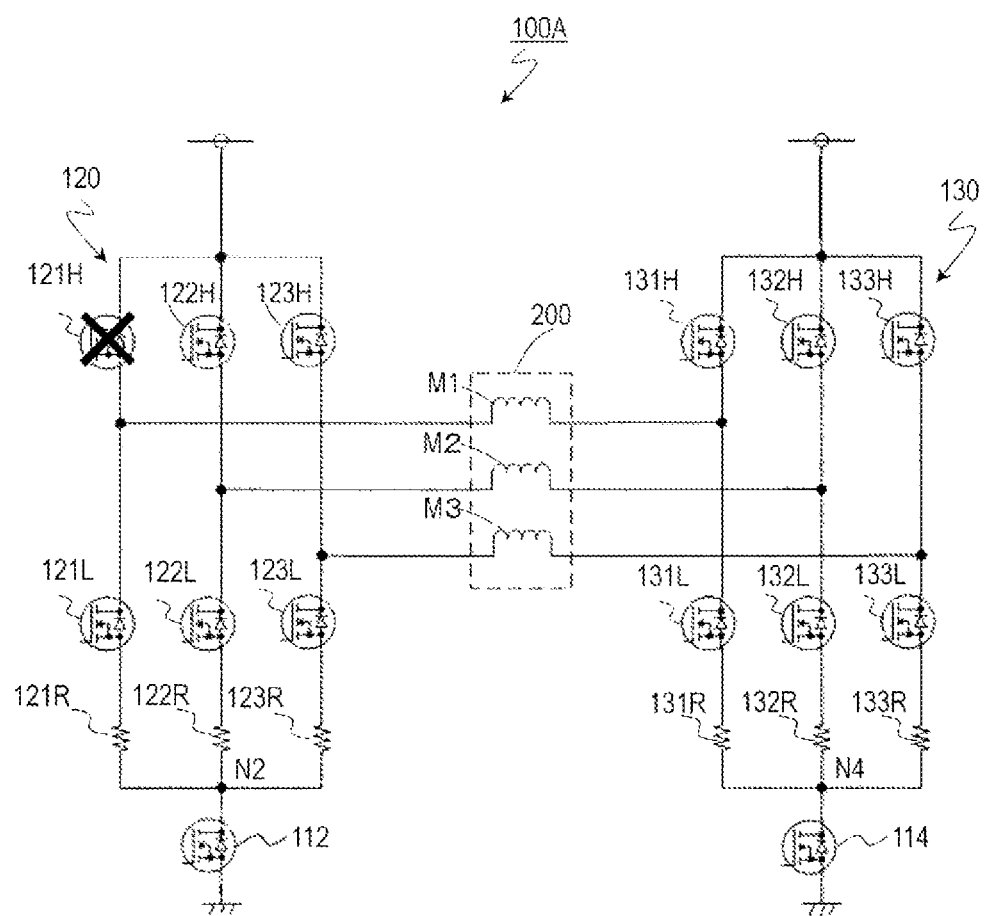
FIG. 11A is a circuit diagram illustrating a circuit configuration of a power conversion device 100A according to a variation of the first exemplary embodiment of the present disclosure.

FIG. 11A schematically illustrates a circuit configuration of the power conversion device 100A that contains the GND side switching circuit having the FETs 112, 114. In the power conversion device 100A shown in FIG. 11A, the switching circuit 110A includes the FET 112. According to this configuration, in the control in the normal state, the control circuit 300 turns on the FET 112 and turns off the FET 114. By turning on all the low-side switching elements of the second inverter 130 and turning off all the high-side switching elements, the neutral point N4 is formed in the second inverter 130. The power conversion device 100A drives the motor 200 using the neutral point N4 and the first inverter 120.

For example, when the FET 121H of the first inverter 120 has the open failure, in the control in the abnormal state, the control circuit 300 turns off the FET 112, turns on the FET 114, turns off the FETs 122H, 123H of the first inverter 120, and turns on the FET 121L, 122L, and 123L. As a result, the neutral point N2 is formed on the low side of the first inverter 120. The power conversion device 100A drives the motor 200 using the neutral point N2 and the second inverter 130.

Figure 11B:
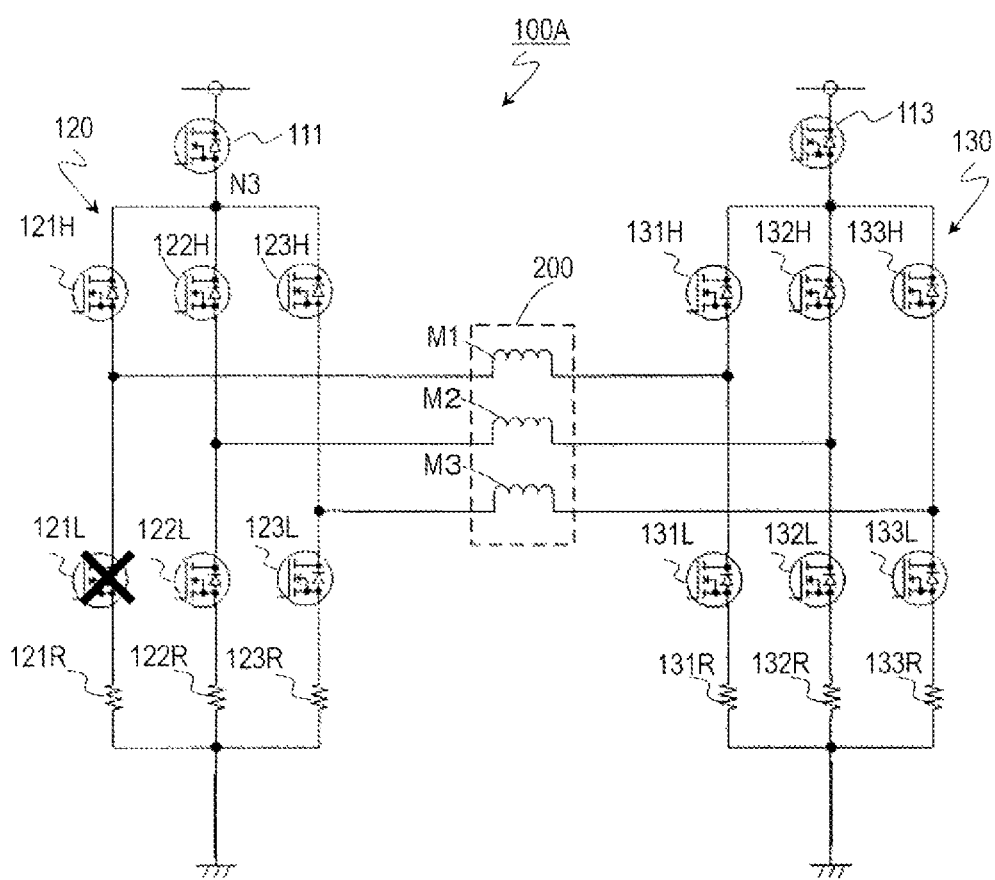
FIG. 11B is a circuit diagram illustrating a circuit configuration of the power conversion device 100A according to the variation of the first exemplary embodiment of the present disclosure.

FIG. 11B schematically illustrates a circuit configuration of the power conversion device 100A that contains the power source side switching circuit having the FETs 111, 113. In the power conversion device 100A illustrated in FIG. 11B, the switching circuit 110A includes the FET 111. According to this configuration, for example, when the FET 121L of the first inverter 120 has the open failure, in the control in the abnormal state, the control circuit 300 turns off the FET 111, turns on the FET 113, turns on the FETs 121H, 122H, 123H of the first inverter 120, and turns off the FETs 122L, 123L. As a result, the neutral point N3 is formed on the high side of the first inverter 120. The power conversion device 100A drives the motor 200 using the neutral point N3 and the second inverter 130.

Figure 11C:
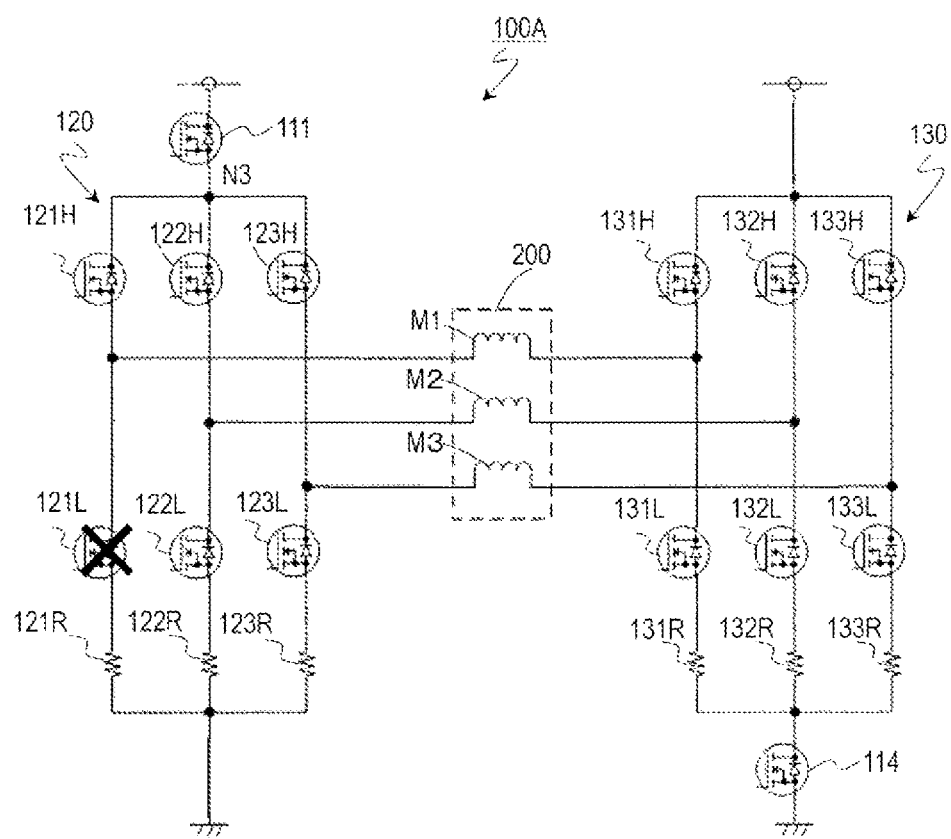
FIG. 11C is a circuit diagram illustrating a circuit configuration of the power conversion device 100A according to the variation of the first exemplary embodiment of the present disclosure.

FIG. 11C schematically illustrates a circuit configuration of the power conversion device 100A that contains the switching circuit 110A having the FET 111 and the switching circuit 110B having the FET 114. According to this configuration, for example, when the FET 121L of the first inverter 120 has the open failure, the neutral point N3 is formed on the high side of the first inverter 120 in the control in the abnormal state. The power conversion device 100A drives the motor 200 using the neutral point N3 and the second inverter 130.

A vehicle such as an automobile generally has an electric power steering device. The electric power steering device generates auxiliary torque for assisting steering torque of a steering system generated by a driver's operation of a steering wheel. The auxiliary torque is generated by an auxiliary torque mechanism, so that a burden of operation by the driver is reduced. For example, the auxiliary torque mechanism is composed of a steering torque sensor, an ECU, a motor, a reduction mechanism, and the like. The steering torque sensor detects the steering torque in the steering system. The ECU generates a drive signal based on a detection signal of the steering torque sensor. The motor generates the auxiliary torque corresponding to the steering torque based on the drive signal, and transmits the auxiliary torque to the steering system via the reduction mechanism.

Figure 12:
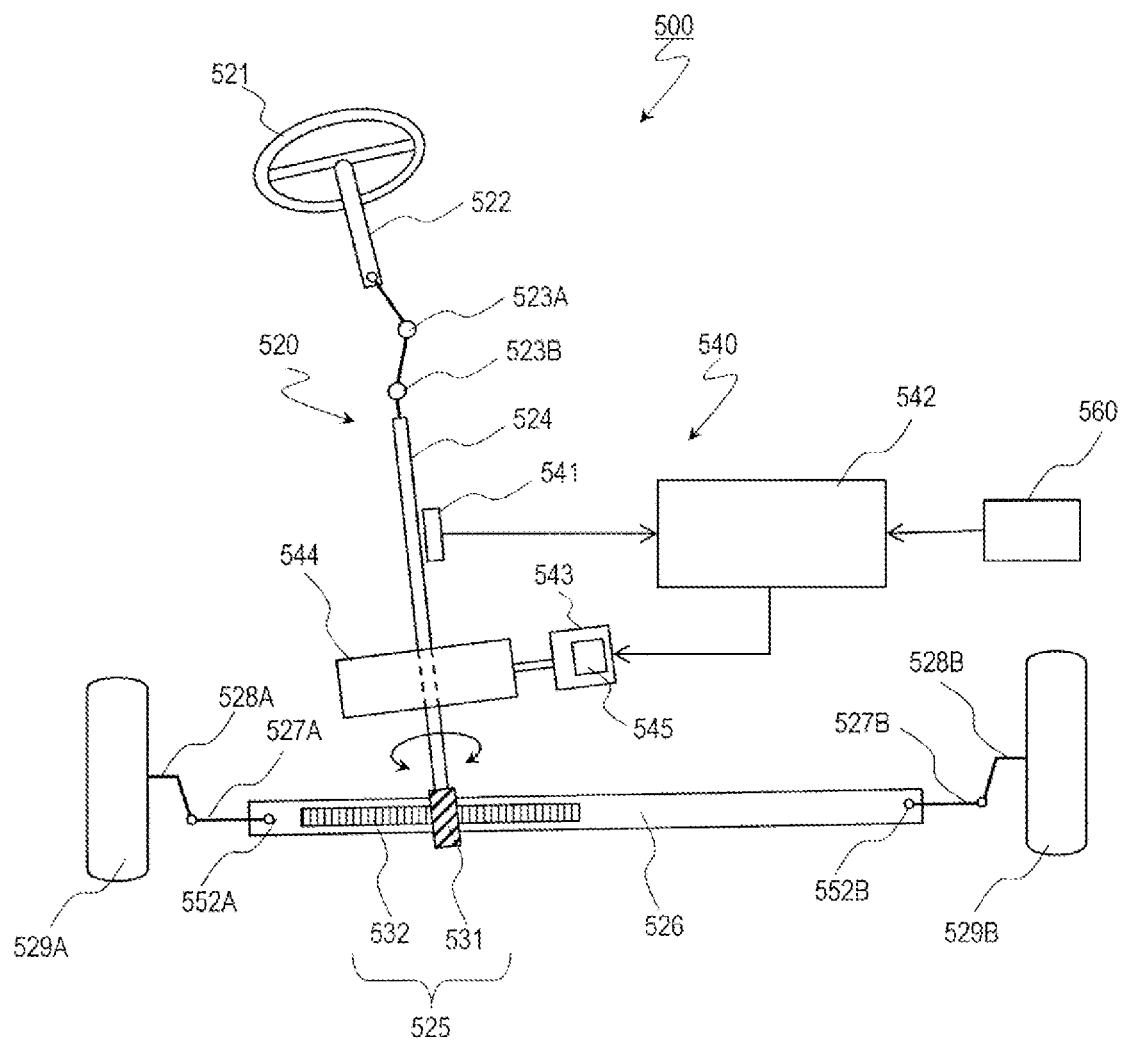
FIG. 12 is a block diagram illustrating a typical configuration of an electric power steering device 500 according to a second exemplary embodiment of the present disclosure.

A motor drive unit 400 of the present disclosure is suitably used for the electric power steering device. FIG. 12 schematically illustrates a typical configuration of an electric power steering device 500 according to the present exemplary embodiment. The electric power steering device 500 includes a steering system 520 and an auxiliary torque mechanism 540.

The steering system 520 may be composed of, for example, a steering wheel 521, a steering shaft 522 (also referred to as a "steering column"), universal joints 523A, 523B, a rotation shaft 524 (also referred to as a "pinion shaft" or "input shaft"), a rack and pinion mechanism 525, a rack shaft 526, left and right ball joints 552A, 552B, tie rods 527A, 527B, knuckles 528A, 528B, and right and left steered wheels (for example, right and left front wheels) 529A, 529B. The steering wheel 521 is connected to the rotation shaft 524 via the steering shaft 522 and the universal joints 523A, 523B. The rack shaft 526 is connected to the rotation shaft 524 via the rack and pinion mechanism 525. The rack and pinion mechanism 525 has a pinion 531 provided on the rotation shaft 524 and a rack 532 provided on the rack shaft 526. To a right end of the rack shaft 526, the right steered wheel 529A is connected via the ball joint 552A, the tie rod 527A, and the knuckle 528A in this order. Similarly to the right side, the left steered wheel 529B is connected to a left end of the rack shaft 526 via the ball joint 552B, the tie rod 527B, and the knuckle 528B in this order. Here, the right side and the left side coincide with a right side and a left side as seen from the driver sitting on a seat respectively.

According to the steering system 520, the steering torque is generated by the driver's operation of the steering wheel 521, and is transmitted to the left and right steered wheels 529A, 529B via the rack and pinion mechanism 525. Thus, the driver operates the left and right steered wheels 529A, 529B.

The auxiliary torque mechanism 540 may be composed of, for example, a steering torque sensor 541, an ECU 542, a motor 543, a reduction mechanism 544, and a power conversion device 545. The auxiliary torque mechanism 540 provides auxiliary torque to the steering system 520 from the steering wheel 521 to the left and right steered wheels 529A, 529B. The auxiliary torque may be referred to as "additional torque" in some cases.

As the ECU 542, the control circuit 300 according to the present disclosure is usable, and the power conversion device 100 according to the present disclosure is usable as the power conversion device 545. Further, the motor 543 corresponds to the motor 200 in the present disclosure. The motor drive unit 400 according to the present disclosure is suitably usable as a mechanically and electrically integrated type motor that may be composed of the ECU 542, the motor 543, and the power conversion device 545.

The steering torque sensor 541 detects the steering torque of the steering system 520 applied by the steering wheel 521. The ECU 542 generates the drive signal for driving the motor 543 based on the detection signal (hereinafter referred to as "torque signal") from the steering torque sensor 541. The motor 543 generates the auxiliary torque corresponding to the steering torque based on the drive signal. The auxiliary torque is transmitted to the rotation shaft 524 of the steering system 520 via the reduction mechanism 544. The reduction mechanism 544 is, for example, a worm gear mechanism. The auxiliary torque is further transmitted from the rotation shaft 524 to the rack and pinion mechanism 525.

The electric power steering device 500 is classified into a pinion assist type, a rack assist type, a column assist type, and so on, depending on a place of the steering system 520 to which the auxiliary torque is applied. FIG. 12 illustrates the pinion assist type electric power steering device 500. However, the electric power steering device 500 is also applied to the rack assist type, the column assist type and the like.

In addition to the torque signal, for example, a vehicle speed signal is also input to the ECU 542. An external device 560 is, for example, a vehicle speed sensor. Alternatively, the external device 560 may be another ECU that communicates via an in-vehicle network such as a controller area network (CAN). The microcontroller of the ECU 542 performs the vector control or the PWM control on the motor 543 based on the torque signal, the vehicle speed signal, and the like.

The ECU 542 sets the target current value at least based on the torque signal. The ECU 542 preferably sets the target current value in consideration of the vehicle speed signal detected by the vehicle speed sensor and further in consideration of the rotation signal of the rotor detected by the angle sensor. The ECU 542 controls the drive signal of the motor 543, that is, the drive current so that the actual current value detected by the current sensor (not shown) conforms to the target current value.

According to the electric power steering device 500, the left and right steered wheels 529A, 529B are operable by the rack shaft 526 utilizing composite torque obtained by adding the auxiliary torque of the motor 543 to the steering torque of the driver. Especially, the electric power steering device having the motor drive unit which improves heat generation countermeasures and enables appropriate current control by utilizing the motor drive unit 400 of the present disclosure for the mechanically and electrically integrated type motor described above is provided.

INDUSTRIAL APPLICABILITY

The embodiments of the present disclosure are widely usable in various devices having various motors such as a vacuum cleaner, a dryer, a ceiling fan, a washing machine, a refrigerator, and an electric power steering device.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device converting electric power from a power source into electric power to be supplied to a motor having n-phase windings, where n is an integer of 3 or more, the power conversion device comprising:
    a first inverter connected to a first end of the winding of each phase of the motor;
    a second inverter connected to a second end of the winding of each phase of the motor;
    a first switching circuit that includes a first switch to switch connection and disconnection between the first inverter and the power source and a second switch to switch connection and disconnection between the first inverter and a ground;
    a second switching circuit that includes a third switch to switch connection and disconnection between the second inverter and the power source or a fourth switch to switch connection and disconnection between the second inverter and the ground; wherein
    the power conversion device operates in operation modes including:
        a normal state operation mode in which power conversion is performed by using a first neutral point of the winding of each phase in the second inverter and the first inverter; and
        an abnormal state operation mode in which the power conversion is performed by using a second neutral point of the winding of each phase in the first inverter and the second inverter;

the operation mode of the power conversion is switched from the normal state operation mode to the abnormal state operation mode when at least one of a plurality of switches included in the first inverter is failed;
the second switching circuit includes the third switch;
the first neutral point is on a high side of the second inverter in the normal state operation mode;
each bridge circuit of the first and second inverters includes n legs each including a low-side switch and a high-side switch; and
in the abnormal state operation mode in a case where the n high-side switches in the bridge circuit of the first inverter include the switch having open failure, the second switch is turned off and the second switching circuit is turned on, and in the bridge circuit of the first inverter, all of the switches other than the failed switch among the n high-side switches are turned off and all the n low-side switches are turned on.

2. The power conversion device according to claim 1, wherein the first and second switches are turned on and the third switch is turned off in the normal state operation mode.

3. The power conversion device according to claim 1, wherein
the second switching circuit includes the fourth switch; and
the first neutral point is on a low side of the second inverter in the normal state operation mode.

4. The power conversion device according to claim 3, wherein the first and second switches are turned on and the fourth switch is turned off in the normal state operation mode.

5. The power conversion device according to claim 1, wherein
each bridge circuit of the first and second inverters includes n legs each including a low-side switch and a high-side switch; and
in the abnormal state operation mode in a case where the n low-side switches in the bridge circuit of the first inverter include the switch having open failure, the first switch is turned off and the second switching circuit is turned on, and in the bridge circuit of the first inverter, all of the switches other than the failed switch among the n low-side switches are turned off and all the n high-side switches are turned on.

6. The power conversion device according to claim 1, wherein
each bridge circuit of the first and second inverters includes n legs each including a low-side switch and a high-side switch; and
in the abnormal state operation mode in a case where the n low-side switches in the bridge circuit of the first inverter include the switch having short-circuit failure, the first and second switches are turned off and the second switching circuit is turned on, and in the bridge circuit of the first inverter, all the switches other than the failed switch among the n low-side switches are turned off and all the n high-side switches are turned on.

7. The power conversion device according to claim 1, wherein the power source is a single power source.

8. A motor drive unit comprising:
a motor;
the power conversion device according to claim 1; and
a control circuit that controls the power conversion device.

9. An electric power steering device comprising the motor drive unit according to claim 8.

10. A power conversion device converting electric power from a power source into electric power to be supplied to a motor having n-phase windings, where n is an integer of 3 or more, the power conversion device comprising:
a first inverter connected to a first end of the winding of each phase of the motor;
a second inverter connected to a second end of the winding of each phase of the motor;
a first switching circuit that includes a first switch to switch connection and disconnection between the first inverter and the power source and a second switch to switch connection and disconnection between the first inverter and a ground;
a second switching circuit that includes a third switch to switch connection and disconnection between the second inverter and the power source or a fourth switch to switch connection and disconnection between the second inverter and the ground; wherein
the power conversion device operates in operation modes including:
a normal state operation mode in which power conversion is performed by using a first neutral point of the winding of each phase in the second inverter and the first inverter; and
an abnormal state operation mode in which the power conversion is performed by using a second neutral point of the winding of each phase in the first inverter and the second inverter;
the operation mode of the power conversion is switched from the normal state operation mode to the abnormal state operation mode when at least one of a plurality of switches included in the first inverter is failed;
the second switching circuit includes the third switch;
the first neutral point is on a high side of the second inverter in the normal state operation mode;
each bridge circuit of the first and second inverters includes n legs each including a low-side switch and a high-side switch; and
in the abnormal state operation mode in a case where the n high-side switches in the bridge circuit of the first inverter include the switch having short-circuit failure, the first and second switches are turned off and the second switching circuit is turned on, and in the bridge circuit of the first inverter, all of the switches other than the failed switch among the n high-side switches are turned off and all of the n low-side switches are turned on.

11. The power conversion device according to claim 10, wherein the first and second switches are turned on and the third switch is turned off in the normal state operation mode.

12. The power conversion device according to claim 10, wherein
the second switching circuit includes the fourth switch; and
the first neutral point is on a low side of the second inverter in the normal state operation mode.

13. The power conversion device according to claim 12, wherein the first and second switches are turned on and the fourth switch is turned off in the normal state operation mode.

14. The power conversion device according to claim 10, wherein
each bridge circuit of the first and second inverters includes n legs each including a low-side switch and a high-side switch; and
in the abnormal state operation mode in a case where the n low-side switches in the bridge circuit of the first inverter include the switch having open failure, the first switch is turned off and the second switching circuit is turned on, and in the bridge circuit of the first inverter, all of the switches other than the failed switch among the n low-side switches are turned off and all the n high-side switches are turned on.

15. The power conversion device according to claim 10, wherein each bridge circuit of the first and second inverters includes n legs each including a low-side switch and a high-side switch; and in the abnormal state operation mode in a case where the n low-side switches in the bridge circuit of the first inverter include the switch having short-circuit failure, the first and second switches are turned off and the second switching circuit is turned on, and in the bridge circuit of the first inverter, all the switches other than the failed switch among the n low-side switches are turned off and all the n high-side switches are turned on.

16. The power conversion device according to claim 10, wherein the power source is a single power source.

17. A motor drive unit comprising:

a motor;

the power conversion device according to claim 10; and a control circuit that controls the power conversion device.

18. An electric power steering device comprising the motor drive unit according to claim 17.

* * * * *